United States Patent
Juneja et al.

(10) Patent No.: US 12,056,710 B2
(45) Date of Patent: Aug. 6, 2024

(54) AUTOMATED RULE GENERATION SYSTEM AND METHODS

(71) Applicant: Actimize LTD., Ra'anana (IL)

(72) Inventors: Harshit Juneja, Shamli (IN); Matthieu Goutet, Carrières-sur-Seine (FR); Pravin Dehiphale, Pune (IN)

(73) Assignee: ACTIMIZE LTD., Ra'anana (IL)

(*) Notice: Subject to any disclaimer, the term of this patent is extended or adjusted under 35 U.S.C. 154(b) by 143 days.

(21) Appl. No.: 17/666,632

(22) Filed: Feb. 8, 2022

(65) Prior Publication Data
US 2023/0252477 A1    Aug. 10, 2023

(51) Int. Cl.
*G06Q 20/40* (2012.01)
(52) U.S. Cl.
CPC ....... *G06Q 20/4016* (2013.01); *G06Q 20/405* (2013.01)
(58) Field of Classification Search
CPC ................................................ G06Q 20/405
See application file for complete search history.

(56) References Cited

U.S. PATENT DOCUMENTS

| | | | | |
|---|---|---|---|---|
| 9,760,861 | B2 * | 9/2017 | Boding | G06Q 40/02 |
| 10,867,303 | B1 * | 12/2020 | Manapat | G06Q 10/067 |
| 2007/0027674 | A1 * | 2/2007 | Parson | G06F 40/211 |
| | | | | 704/9 |
| 2015/0379430 | A1 * | 12/2015 | Dirac | G06N 20/00 |
| | | | | 706/12 |
| 2019/0087737 | A1 * | 3/2019 | Pendar | G06F 17/18 |
| 2022/0121967 | A1 * | 4/2022 | Azizsoltani | G06N 5/025 |

FOREIGN PATENT DOCUMENTS

WO    WO-2021158702 A1 *  8/2021  .............. B25J 13/00

OTHER PUBLICATIONS

"Cella et al., Towards Fraud Detection Methodologies, Jun. 10, 2010, IEEE Xplore, entire document" (Year: 2010).*

* cited by examiner

*Primary Examiner* — Abhishek Vyas
*Assistant Examiner* — Adam Hilmantel
(74) *Attorney, Agent, or Firm* — Haynes and Boone, LLP

(57) ABSTRACT

A processor is adapted to automatically generate and validate rules for monitoring suspicious activity by: For a first period of time, collecting a first group of transactions, automatically identifying and storing key indicators from the transactions, and automatically storing which of the transactions are pre-identified as fraudulent. Based on the key indicators and the pre-identified fraudulent transactions, training a learning algorithm and, with the learning algorithm, generating a decision tree of logical predicates including the key indicators. Based on the decision tree, generating a plurality of rules, each of which incorporates only one logical predicate from each layer of the decision tree. For a second period of time: collecting a second group of transactions, and generating a quality metric for each rule, by automatically testing the rules against the second group of transactions, and identifying a subset of rules for which the quality metric exceeds a threshold.

20 Claims, 11 Drawing Sheets

AUTOMATED RULE GENERATION SYSTEM AND METHODS

TECHNICAL FIELD

The subject matter described herein relates to systems, methods, and devices for generating rules for rule-based anomaly detection systems. This automated rule generation system has particular but not exclusive utility for detecting fraudulent banking transactions.

BACKGROUND

Financial institutes uses rule-based detection systems to monitor suspicious activity and to help detect money laundering and/or fraud using limited one-size-fits-all rules. Once rules are developed, the same rules will generally remain in place for the foreseeable future, as they enable financial institutions to prove to customers and regulator that mandatory red flags are being covered. However, criminals are always trying to find new ways of committing fraud, and limited rule sets may not be able to catch such new types of suspicious activity. Sometimes even banks and regulators are not sure which exact set of rules will be sufficient to capture accounts operated with criminal intent.

Thus, new and unknown suspicious activities performed by criminals may currently be going unnoticed, since current systems focus on limited sets of rules. Existing rule logic therefore needs regular improvement to make it more effective. However, introducing new rules can be a lengthy trial-and-error process, especially when business users are unsure of what data elements they should be using in the rules. It can also be challenging for institutions to decide on a certain set of rules that will provide the best overall coverage.

Traditional solutions to these problems are heavily dependent on business analysts, small- and medium-sized enterprises (SMEs), and various third-party regulators to form new rules or new sets of rules. Coming up with even one single rule may require a lot of domain knowledge, and regularly updating these rules requires continuous upskill and dedication of SMEs. This process is predominantly manual in nature, and requires a high number of back-and-forth activities. Past attempts to automate rule generation have tended to generate complex rules that are difficult to read, understand, test, modify, or implement, that are brittle in the face of changing conditions, and that may underperform as compared with human-generated rules.

Thus, it is to be appreciated that such commonly used rule generation systems have numerous drawbacks, including subjectivity, long lead times, inflexibility in the face of changing criminal behavior, overreliance on expert knowledge, uncertainty of results, and otherwise. Accordingly, long-felt needs exist for systems that address the forgoing and other concerns.

The information included in this Background section of the specification, including any references cited herein and any description or discussion thereof, is included for technical reference purposes only and is not to be regarded as subject matter by which the scope of the disclosure is to be bound.

SUMMARY

The automated rule generation system disclosed herein makes use of Rule-Based-Machine Learning, in two phases. The first phase involves preparing a Key Indicator (KI) data warehouse, by identifying KI features that capture all the relevant aspects of a body of stored transactions. The second phase involves applying a custom decision tree machine learning algorithm to the KIs identified in the KI warehouse. First, the prepared KI warehouse may be enhanced with information about which transactions in the warehouse have been red-flagged as possibly fraudulent. Such flagging may for example have been performed over a period of months, either manually, automatically, or combinations thereof. In some cases, preliminary screening may be performed automatically, with a human expert following up on those items deemed suspicious. A customized decision tree algorithm is then applied to generate a simple set of rules for separating fraudulent transactions from legitimate ones. Each generated rule may then be evaluated against business metrics. Top performing rules can then be configured into a client's rule-based fraud detection system.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a system adapted to automatically generate and validate rules for monitoring suspicious activity. The system includes a processor and a computer readable medium operably coupled thereto, the computer readable medium including a plurality of instructions stored in association therewith that are accessible to, and executable by, the processor, to perform operations. The operations include, for a first period of time, collecting a first group of transactions issued by an issuer, automatically identifying and storing a plurality of key indicators of the first group of transactions, automatically storing pre-identified fraudulent transactions of the first group of transactions. The operations also include, based on the plurality of key indicators and the pre-identified fraudulent transactions, training a learning algorithm; with the learning algorithm, generating a decision tree incorporating logical predicates including at least some key indicators of the plurality of key indicators; based on the decision tree, generating a plurality of rules, where each rule of the plurality of rules incorporates only one logical predicate from each layer of the decision tree. The operations also include, for a second period of time, collecting a second group of transactions issued by an issuer; generating a quality metric for each respective rule of the plurality of rules, by automatically testing the plurality of rules against the second group of transactions; and identifying a subset of rules of the plurality of rules for which the respective quality metric exceeds a threshold value. Other embodiments of this aspect include corresponding computer systems, apparatus, and computer programs recorded on one or more computer storage devices, each configured to perform the actions of the methods.

Implementations may include one or more of the following features. In some embodiments, the plurality of key indicators includes at least one of a transaction value for at least one transaction of the first group of transactions, a volume of transactions of the issuer, a credit limit of the issuer, a risk category of the issuer, or a net worth of the issuer, or a ratio of any two of the foregoing. In some embodiments, the plurality of key indicators includes at least one of a monthly pattern or a weekly pattern of at least one key indicator of the plurality of key indicators. In some embodiments, the operations further include, for each respective rule of the plurality of rules, if a first logical predicate of the respective rule is logically redundant with a second logical predicate of the respective rule, deleting the first logical predicate of the respective rule. In some embodiments, the quality metric includes at least one of a number or fraction of true positives, a number or fraction of false positives, a precision value, a recall value, an F1 value, or an Fbeta value. In some embodiments, the quality metric includes a number of logical predicates within the respective rule. In some embodiments, the operations further include, with the learning algorithm, generating a plurality of decision trees, where each decision tree of the plurality of decision trees incorporates logical predicates including at least some key indicators of the plurality of key indicators; and based on each respective decision tree of the plurality of decision trees, generating a plurality of additional rules of the plurality of rules, where each additional rule of the plurality of rules incorporates only one logical predicate from each layer of the respective decision tree of the plurality of decision trees. In some embodiments, the operations further include generating a respective plurality of quality metric for each respective rule of the plurality of rules, by automatically testing the plurality of rules against the second group of transactions; and identifying the subset of rules of the plurality of rules based on whether any respective quality metric of the respective plurality of quality metrics exceeds a respective threshold for that respective quality metric. In some embodiments, the learning algorithm is a rule-based machine learning algorithm. In some embodiments, the rule-based machine learning algorithm is a learning classifier system, association rule learning system, or artificial immune systems. Implementations of the described techniques may include hardware, a method or process, or computer software on a computer-accessible medium.

One general aspect includes a computer-implemented method adapted to automatically generate and validate rules for monitoring suspicious activity. The computer-implemented method includes, for a first period of time, collecting a first group of transactions issued by an issuer, automatically identifying and storing a plurality of key indicators of the first group of transactions, automatically storing pre-identified fraudulent transactions of the first group of transactions; based on the plurality of key indicators and the pre-identified fraudulent transactions, training a learning algorithm; with the learning algorithm, generating a decision tree incorporating at least some key indicators of the plurality of key indicators; and, based on the decision tree, generating a plurality of rules, where each rule of the plurality of rules incorporates only one logical predicate from each layer of the decision tree. The computer-implemented method also includes, for a second period of time, collecting a second group of transactions issued by an issuer; generating a quality metric for each respective rule of the plurality of rules, by automatically testing the plurality of rules against the second group of transactions; and identifying a subset of rules of the plurality of rules for which the respective quality metric exceeds a threshold value. Other embodiments of this aspect include corresponding computer systems, apparatus, and computer programs recorded on one or more computer storage devices, each configured to perform the actions of the methods.

Implementations may include one or more of the following features. In some embodiments, the plurality of key indicators includes at least one of a transaction value for at least one transaction of the first group of transactions, a volume of transactions of the issuer, a credit limit of the issuer, a risk category of the issuer, or a net worth of the issuer, or a ratio of any two of the foregoing. In some embodiments, the plurality of key indicators includes at least one of a monthly pattern or a weekly pattern of at least one key indicator of the plurality of key indicators. In some embodiments, the computer-implemented method further including, for each respective rule of the plurality of rules, if a first logical predicate of the respective rule is logically redundant with a second logical predicate of the respective rule, deleting the first logical predicate of the respective rule. In some embodiments, the quality metric includes at least one of a number or fraction of true positives, a number or fraction of false positives, a precision value, a recall value, an F1 value, or an Fbeta value. In some embodiments, the quality metric includes a number of logical predicates within the respective rule. In some embodiments, the method further includes, with the learning algorithm, generating a plurality of decision trees, where each decision tree of the plurality of decision trees incorporates logical predicates including at least some key indicators of the plurality of key indicators; and based on each respective decision tree of the plurality of decision trees, generating a plurality of additional rules of the plurality of rules, where each additional rule of the plurality of rules incorporates only one logical predicate from each layer of the respective decision tree of the plurality of decision trees. In some embodiments, the method further includes generating a respective plurality of quality metrics for each respective rule of the plurality of rules, by automatically testing the plurality of rules against the second group of transactions; and identifying the subset of rules of the plurality of rules based on whether any respective quality metric of the respective plurality of quality metrics exceeds a respective threshold for that respective quality metric. In some embodiments, the learning algorithm is a rule-based machine learning algorithm. In some embodiments, the rule-based machine learning algorithm is a learning classifier system, association rule learning system, or artificial immune system. Implementations of the described techniques may include hardware, a method or process, or computer software on a computer-accessible medium.

BRIEF DESCRIPTION OF THE DRAWINGS

Illustrative embodiments of the present disclosure will be described with reference to the accompanying drawings, of which.

DETAILED DESCRIPTION

Figure 1:
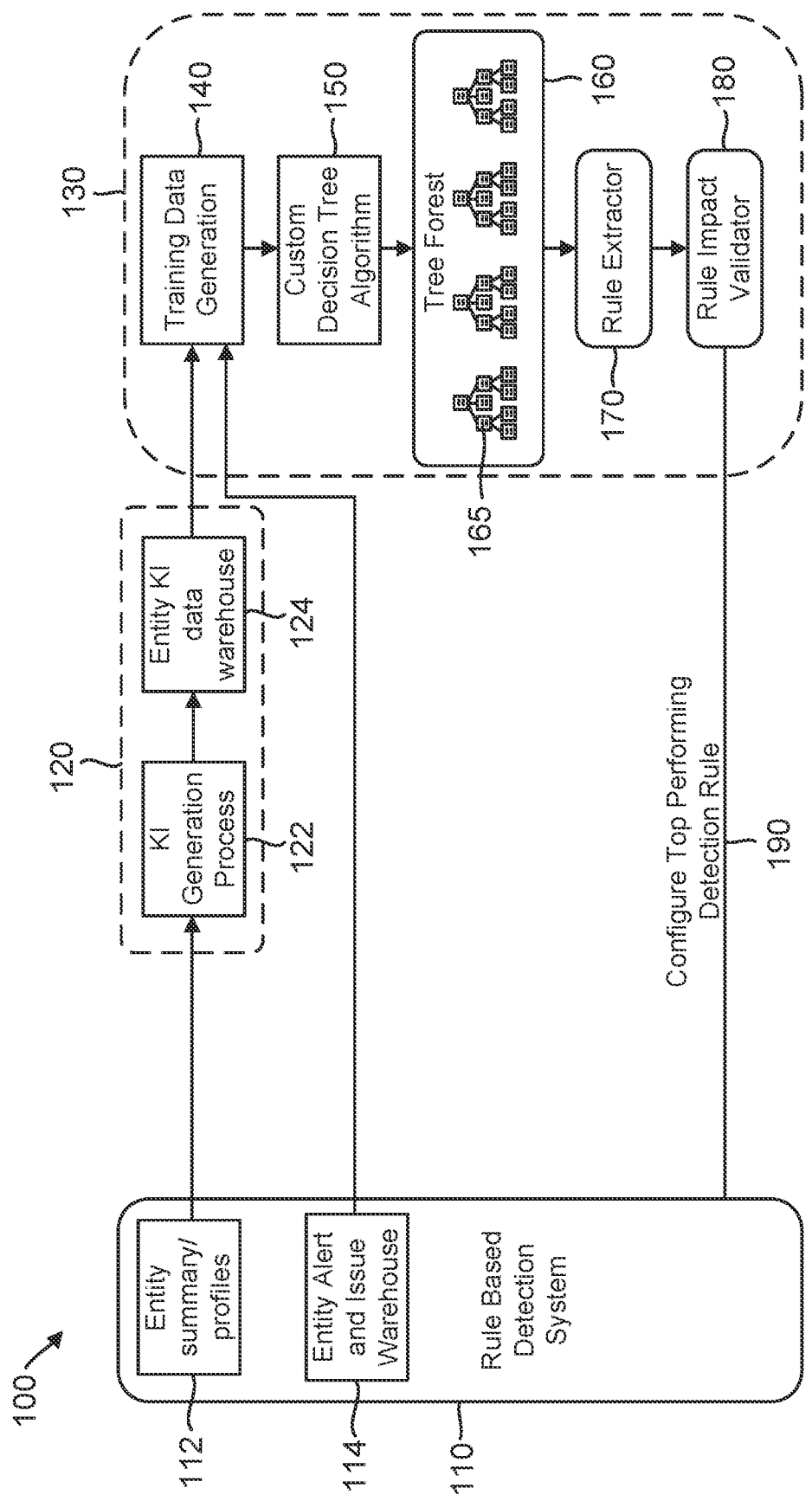
FIG. 1 is a representation, in block diagram form, of at least a portion of an example automated rule generation system, in accordance with at least one embodiment of the present disclosure.

In accordance with at least one embodiment of the present disclosure, an automated rule generation system is provided which automatically generates rules for rule-based fraud detection systems. The automated rule generation system may for example operate in a data analysis phase and a rule generation phase. The data analysis phase involves preparing a Key Indicator (KI) data warehouse. As a part of this phase, the system derives KI features that capture all the relevant aspects of a population of transactions that are, for example, stored over a period of months. The KIs may for example include, but are not limited to:

Value of the transaction (Sum of Amount)
Volume of the transactions (Number of Transactions)
Static Attributes of Accounts (Credit Limit, Risk Category, Net Worth)
Ratios of different attributes
Monthly and weekly patterns with defined features The rule generation phase involves applying a custom decision tree machine learning algorithm to the KIs identified in the KI warehouse. First, the prepared KI warehouse may be enhanced with information about which transactions in the warehouse have been red-flagged as possibly fraudulent. Such flagging may for example have been performed over a period of months, either manually, or by an automatic rule-based fraud detection system employing a previous set of rules, or combinations thereof. In some cases, preliminary screening may be performed automatically, with a human expert following up on those items deemed suspicious, and red-flagging those that are confirmed to be fraudulent.

Next, a customized decision tree algorithm can be applied that generates a simple set of rules for separating likely fraudulent from likely legitimate transactions. In some embodiments, the number of rules generated and/or the maximum number of features per rule may be configurable as a part of the algorithm. Each generated rule may then be evaluated and measured against business metrics such as precision and recall. Top performing rules are selected, and can then be configured for incorporation into a client's new or pre-existing rule-based fraud detection system. The freshly generated rules may for example be based on new patterns that may be specific to the client, thus providing improved coverage. In some embodiments, the automated rule generation system may develop modified versions of one or more existing rules to improve results.

The automated rule generation system can be used with existing rule-based fraud detection or anomaly detection systems, whether newly installed or already operational. As such, the automated rule generation system may improve the fraud detection processes, results, and metrics of any organizations that monitors entities—persons, companies, accounts, etc.—for anomalous or fraudulent behavior using virtually any rule-based system. Such potential users may include financial services companies, financial software vendors, banks, retailers, fraud detection firms, etc.

The present disclosure aids substantially in fraud detection by increasing detection rates, lowering the rate of false positives, improving the simplicity and human-readability of rules, and improving the ability of rule-based fraud detection systems to adapt to changing criminal behavior in real time or near-real time. Implemented on a processor in communication with a memory structure or database, the system disclosed herein provides practical reductions in successful transaction fraud. This improved rule generation transforms a subjective, labor-intensive process into a fast, accurate, repeatable, and resource-efficient machine learning process that can be executed against stored transactions on demand, without the normally routine need to rely on the expertise of human fraud detection specialists. This unconventional approach improves the functioning of the fraud detection computer system (e.g., an integrated fraud management computer system), by reducing the number and complexity of rules, and by reducing the difficulty of adding new rules or modifying existing ones.

The automated rule generation system may be implemented as a process at least partially viewable on a display, and operated by a control process executing on a processor that accepts user inputs from a keyboard, mouse, or touchscreen interface, and that is in communication with one or more databases. In that regard, the control process performs certain specific operations in response to different inputs or selections made at different times. Certain structures, functions, and operations of the processor, display, sensors, and user input systems are known in the art, while others are recited herein to enable novel features or aspects of the present disclosure with particularity.

These descriptions are provided for exemplary purposes only, and should not be considered to limit the scope of the dimensional reduction integrated fraud management system. Certain features may be added, removed, or modified without departing from the spirit of the claimed subject matter.

For the purposes of promoting an understanding of the principles of the present disclosure, reference will now be made to the embodiments illustrated in the drawings, and specific language will be used to describe the same. It is nevertheless understood that no limitation to the scope of the disclosure is intended. Any alterations and further modifications to the described devices, systems, and methods, and any further application of the principles of the present disclosure are fully contemplated and included within the present disclosure as would normally occur to one skilled in the art to which the disclosure relates. In particular, it is fully contemplated that the features, components, and/or steps described with respect to one embodiment may be combined with the features, components, and/or steps described with respect to other embodiments of the present disclosure. For the sake of brevity, however, the numerous iterations of these combinations will not be described separately.

FIG. 1 is a representation, in block diagram form, of at least a portion of an example automated rule generation system 100, in accordance with at least one embodiment of the present disclosure. In the example shown in FIG. 1, the automated rule generation system 100 includes a rule-based detection system 110, such as a bank fraud detection system or retail fraud detection system. The rule-based detection system 110 includes a repository of entity summaries and entity profiles 112, and an entity alert and issue warehouse 114. In an example, the summaries and entity profiles 112 relate to a number of individual entities such as accounts, customers, suppliers, payors, payees, transactions, etc. There may be a small number of entities (e.g., 1-5 entities) or a large number of entities (e.g., millions or billions of entities), or values in between, or combinations thereof. In an example, the entity alert and issue warehouse 114 includes stored information about events or transactions that are suspected and/or confirmed to be fraudulent or otherwise anomalous.

The automated rule generation system 100 also includes a Key Indicator (KI) preparation stage (or KI preparation process, method, system, or subsystem) 120. In an example, the KI preparation stage 120 is configured to intelligently prepare KIs or detection variables for entities with identified alerts or issues. These KIs can then serve as possible detection variables for use in detection rule predicates. In an example, the KI preparation stage 120 includes a KI generation process 122 and an entity KI data warehouse 124. The KI generation process 122 may for example receive the profiles or summaries containing behavior of each entity over a given period of time. These profiles can be used to curate the new possible Key Indicators which will help to identify the fraudsters or non-fraudsters (or other types of anomalies, depending on the implementation). Key Indicators may for example include ratios or sums related to transaction type for particular entities, standard deviations of transactions done by the entity in the past 6 months, or transaction sum done by the entity in a month, or total transactions done by entity in last six month, or other variables or functions or combinations thereof.

The KI generation process 122 may help generate the KI data for each of the entity based on defined logic for the KIs. This can for example be executed in near-real time (e.g., on a daily or weekly basis) to generate the particular KI data based on the transaction performed for an entity. Meaningful KIs are those that help to differentiate between fraudulent and non-fraudulent activity.

Once the KI data is generated, it is then passed on to the entity KI data warehouse 124, which helps to store the KI data. The KI data warehouse 124 may include any number of KIs. For example, depending on the implementation, the KI warehouse may include 1-10 KIs that are known or suspected to have particular relevance, or may include tens of KIs, hundreds of KIs, thousands of KIs, or other values greater or smaller, for downstream evaluation by the custom decision tree machine learning algorithm 130. The entity KI Data warehouse 124 may for example store the data the generated by the KI generation process 122 for each entity. There could be different dimensions at which data can be stored for an entity. It can be at transaction type level for each entity for a particular month or day or week. This can be best defined to capture behavior of entity based on the KI defined logic. The calculated and generated KIs stored in the KI data warehouse 124 may then be passed onto the detection rule generation process 130.

The detection rule generation process 130 works to identify the specific KIs which can be used to segregate fraudulent and non-fraudulent entities or transactions. In an example, this is done by a training data generation step (or module, process, method, device, system, or subsystem) 140, which prepares a suitable training dataset that matches alerted entities or transactions (e.g., from the entity alert and issue warehouse 114) against KIs from the entity KI data warehouse 124. This dataset can then be used as training data by the custom decision tree algorithm 150. In an example, the training dataset may be generated for a particular time period and can the KIs (e.g., several KIs, tens of KIs, hundreds of KIs, or thousands of KIs) from the KI preparation process 120. The training dataset may include, or may be associated with, the disposition of entities, which can for example be used as labels for training purposes. The training dataset may be configured for use with a supervised classification problem, or related learning algorithm.

Duration for the training dataset can be defined based on past experience of system developers, users, or operators, or may be determined algorithmically. In some implementations, several years' worth of data may be used. In other implementations, a shorter period of days or weeks may be sufficient. In still other implementations, a period of months (e.g., 3-4 months) may enable the generation of strong, simple rules in near-real time (e.g., on a daily, weekly, or monthly basis). Generally speaking, the training dataset should contain both fraudsters' and non-fraudsters' data at the entity level. In an example, each row of the training dataset represents a single entity, while each column represents a KI from KI data warehouse 124, along with labels such as "Fraudster" and "Non-Fraudster", and/or the entity name Once the training dataset has been developed by the training data generation step 140, it is then received by the custom machine learning (ML) decision tree algorithm 150. The customized ML decision tree algorithm 150 uses the training dataset to generate a tree forest 160, e.g., a number of decision trees (e.g., 2-10 decision trees, tens of decision trees, hundreds of decision trees, thousands of decision trees 165, or other numbers both greater and smaller). Each decision tree 165 includes a number of layers or depths (e.g., 2-5 layer or depths, although other numbers both greater and smaller may be used instead or in addition), and each layer or depth includes a number of branches (e.g., 2-10 branches, although other numbers both greater and smaller may be used instead or in addition). Each branch may for example contain a logical predicate based on a KI from the KI data warehouse 124.

The tree forest 160 is then received into the rule extractor 170 (which may be a step, process, method, device, system, subsystem, etc.), which generates a number of rules, each rule including a number of predicates, based on the decision trees 165 in the decision tree forest 160, as described below in FIG. 6. In an example, the rule extractor may generate tens, hundreds, or thousands of different rules, and each rule may include 1-10 logical predicates, although other numbers both greater and smaller may be used instead or in addition.

These rules are then received by the rule impact validator 180. In an example, the rule impact validator evaluates the effectiveness of each rule on the past-alerted entities from the entity alert and issue warehouse 114, generating metrics for each rule such as the number, ratio, or fraction of true positives (TP), false positives (FP), true negatives (TN), false negatives (FN), or combinations or functions thereof. For example, "precision" is defined as TP/(TP+FP), while "recall" is defined as the fraction of true positives that are found vs. the total number of true positives that exist in the dataset. Precision and recall may capture more information in a single value than TP, FP, TN, or FN alone, and so may be preferred metrics in some implementations. Other metrics may for example include F1 (the harmonic mean of precision and recall, giving each the same weighting) and FBeta (a harmonic mean of precision and recall where the two values are weighted differently, based on a "beta" parameter). Based on one or more of these metrics, high-performing rules can be identified, while low-performing rules are rejected.

The simplicity of each rule may also be evaluated, such that high-performing rules with a smaller number of logical predicates are favored over high-performing rules with a larger number of logical predicates. In general, simpler rules may be easier to use and maintain, easier for a human to read and interpret, and may be less likely to conflict or interact with other rules in a rule set. The top performing rules may then be selected. In an example, the top-performing rules may be the "n" rules (e.g., where "n" is 1-10, although other numbers may be used instead or in addition) that score highest on a particular metric. In another example, the top-performing rules may be all of the rules which have a performance metric above or below a threshold value (e.g., more than 10 TP hits, with a precision above 50%), that also include fewer than "m" predicates (e.g., where "m" is 1-10, although other numbers could be used instead or in addition).

Once the top-performing rules have been identified, they can be received by a rule configuration step 190, which formats them for use in the rule-based detection system 110 as new detection rules. In some embodiments, the automated rule generation system 100 may be used daily, weekly, monthly, or at any other desired interval (whether real-time or near-real-time) to update the rules that are used by the rule-based detection system 110, in order to stay ahead of changing market conditions, changing criminal behavior, and other factors.

New rules that are generated by the rule-based detection system 110 can be validated by financial institutions that use them, and the system can thus create a new library of highly effective rules. In some embodiments, a marketplace of rules may include of all the new rules, even if they are created using the data of other clients. This marketplace of rules may for example be useful for any new client who has no prior history of criminal-minded accounts, and may be useful to existing clients as well. Thus, the solution can work across financial institutions, without compromising data breaches, and with an end-product (e.g., detection rules) that is well known and accepted by the industry. The system can also identify false negatives, and may thus increase TP rate, as most of the solutions are likely to reduce FP.

The system can be configured to work in conjunction with a broad variety of rule-based monitoring systems. The rule-based monitoring system monitors the entity using the pre-defined set of rules which are executed on regular interval basis. Within a financial institute, the entity is generally an account or group of accounts to be monitored. Detection logic for these rules may be defined using one or multiple detection variables, with a threshold applied to each detection variable to form a complete predicate for the rule.

Rule logic helps to validate the intended behavior of an entity and generates a flag, warning, or alert if the rule condition is violated. For example, there might be multiple rules in the detection system which would be violated for a particular entity (e.g., a particular transaction, account, customer, etc.), which are then consolidated to generate single alert for the entity. These generated alerts may for example be investigated by an investigator, to verify the true behavior of the entity based on the rules violated. If the alert represents the true behavior of the entity, these alerts may be dispositioned as an "issue" (e.g., a suspected fraud) and may otherwise be dispositioned as "non-issue" (e.g., believed to be legitimate). Dispositioned alerts may be useful to identify a particular entity as either a potential fraudster or a legitimate entity, and may for example be stored for every month, based on the investigation.

In addition, the rule-based system may store profiles and summaries related to the entities, generated based on the transactional data of the entities (e.g., in the entity summaries and profiles 112). These summaries and profiles may for example store behavioral data for the entities. In the particular case of financial institutions, the profile can be based on the duration of transactions of selected entities. These could for example be monthly, daily, or weekly profiles representing the respective behavior of the entities. Profiles may be generated for different transaction types associated with an account, based on the transaction date.

Thus, from the standpoint of a financial institution, new rules are generated by the system automatically, and are configured such they can be readily understood, tested, and validated by business user at the financial institution. The validated rule can then optionally be shared across multiple financial institutions, and optionally customized for particular institutions.

Before continuing, it should be noted that the examples described above are provided for purposes of illustration, and are not intended to be limiting. Other devices and/or device configurations may be utilized to carry out the operations described herein.

FIGS. 2-3 and 5-8 show flow diagrams of example methods, in accordance with embodiments of the present disclosure. It is understood that the steps of the methods described herein may be performed in a different order than shown or described. Additional steps can be provided before, during, and after the steps as shown, and/or some of the steps shown or described can be replaced or eliminated in other embodiments. One or more of steps of the methods can be carried by one or more devices and/or systems described herein, such as components of the system 100 and/or processor circuit 1050 (see FIG. 10).

The flow diagrams provided herein are for exemplary purposes; a person of ordinary skill in the art will recognize myriad variations that nonetheless fall within the scope of the present disclosure. The logic of the methods may for example be shown as sequential. However, similar logic could be parallel, massively parallel, object oriented, real-time, event-driven, cellular automaton, or otherwise, while accomplishing the same or similar functions. In order to perform the method, a processor circuit (e.g., processor circuit 1050 of FIG. 10) may divide each of the steps described herein into a plurality of machine instructions, and may execute these instructions at the rate of several hundred, several thousand, several million, or several billion per second, in a single processor or across a plurality of processors. Such rapid execution may be necessary in order to execute one or more of the methods in real time or near-real time as described herein. For example, in some embodiments, the system may need to analyze 3-4 months' worth of transactions on a daily or hourly basis, to extract KIs, generate training data, generate a decision tree forest, extract rules from the decision trees, identify the top-performing rules, and incorporate the top performing rules into the rule-based detection system.

Figure 2:
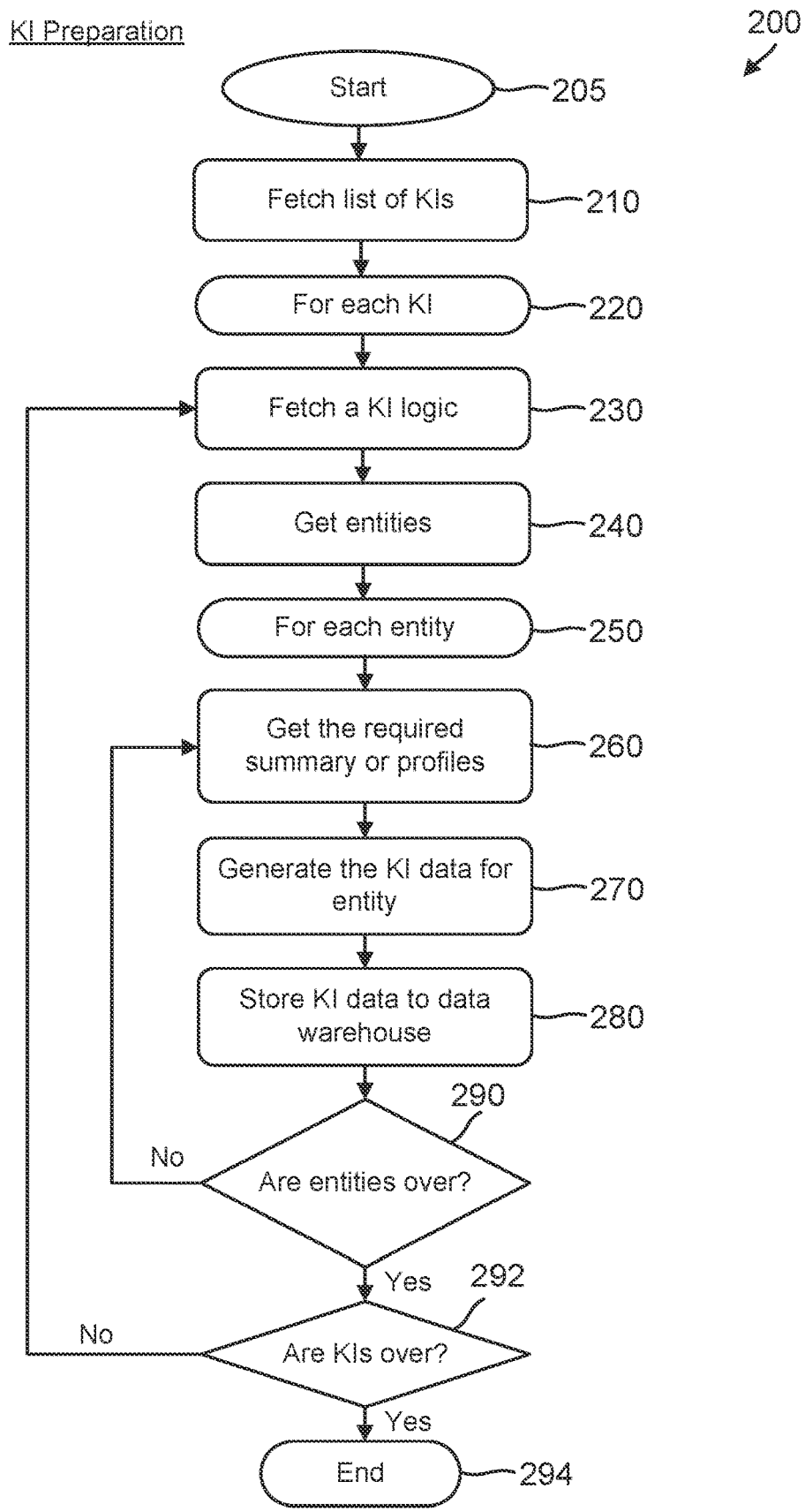
FIG. 2 shows a flow diagram of an example key indicator preparation method that may be performed by the automated rule generation system, according to at least one embodiment of the present disclosure.

FIG. 2 shows a flow diagram of an example key indicator (KI) preparation method 200 that may be performed by the automated rule generation system 100, according to at least one embodiment of the present disclosure.

In step 205, the method begins. Execution then proceeds to step 210.

In step 210, the method includes fetching a list of KIs (e.g., from the entity summary and profiles 112 of FIG. 1). Execution then proceeds to step 220.

In step 220, the method begins a loop that executes for each KI. Execution then proceeds to step 230.

In step 230, the method includes fetching a KI logic (e.g., from the rule-based detection system 110 of FIG. 1). Execution then proceeds to step 240.

In step 240, the method includes fetching a list of entities (e.g., from the entity summary and profiles 112 of FIG. 1). Execution then proceeds to step 250.

In step 250, the method begins a loop that executes for each entity. Execution then proceeds to step 260.

In step 260, the method includes fetching the required summary or profile for the current entity (e.g., from the entity summary and profiles 112 of FIG. 1). Execution then proceeds to step 270.

In step 270, the method includes generating the KI data for the current entity. This may for example involve scanning all transactions for the current entity within a specified period of time (e.g., the past 2-3 months), and identifying the values of the current KI for each transaction. Execution then proceeds to step 280.

In step 280, the method includes storing the KI data for the current entity into the KI data warehouse (e.g., KI data warehouse 124 of FIG. 1). Execution then proceeds to step 290.

In step 290, the method includes checking whether all available entities have been processed according to steps 260-280. If yes, execution proceeds to step 292. If no, execution returns to step 260 for the next available entity.

In step 292, the method includes checking whether all KIs have been processed according to steps 230-290. If yes, execution proceeds to step 294. If no, execution returns to step 230 for the next available KI.

In step 294, the method is complete.

Figure 3:
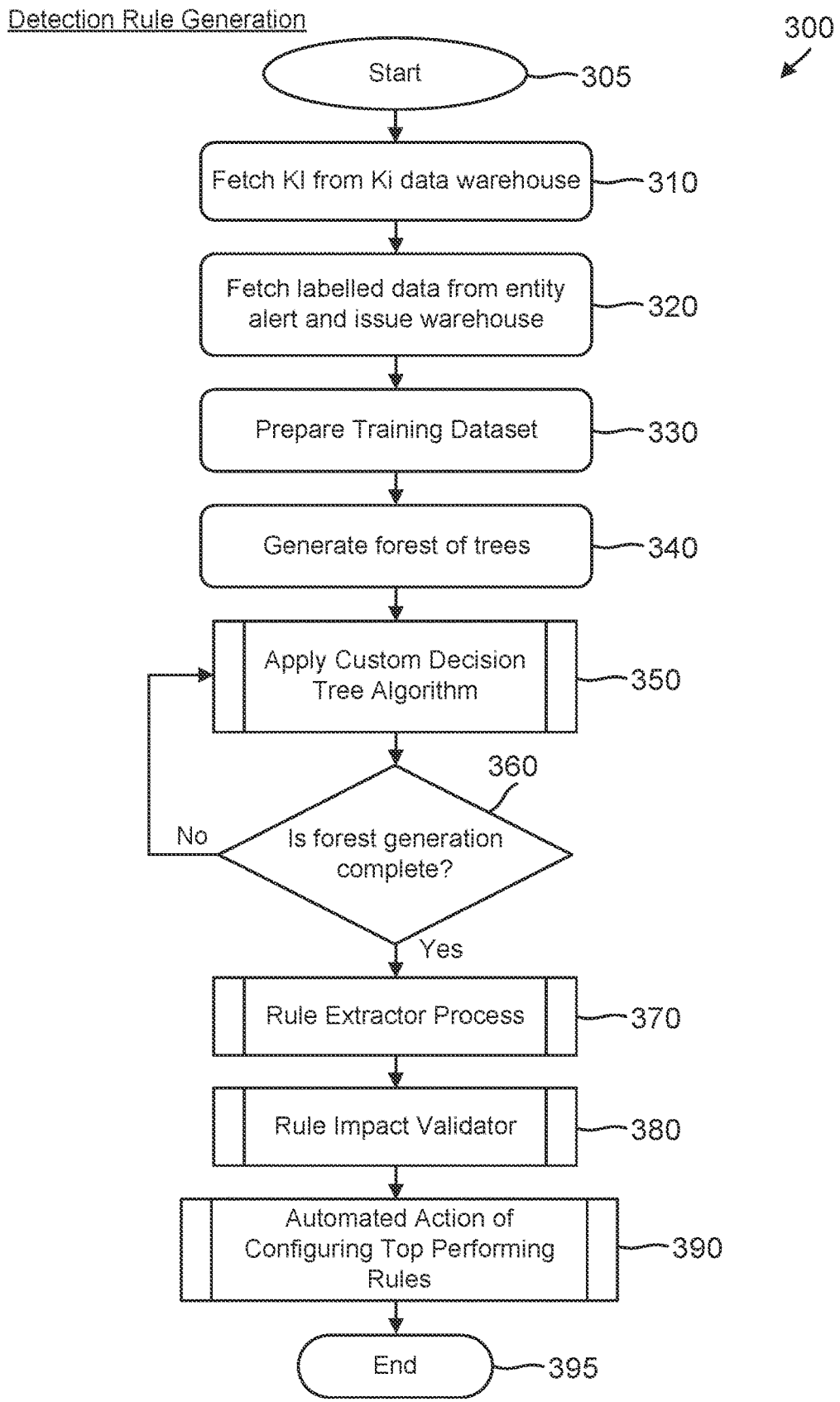
FIG. 3 shows a flow diagram of an example detection rule generation method that may be performed by the automated rule generation system, according to at least one embodiment of the present disclosure.

FIG. 3 shows a flow diagram of an example detection rule generation method 300 that may be performed by the automated rule generation system 100, according to at least one embodiment of the present disclosure.

In step 305, the method begins. Execution then proceeds to step 310.

In step 310, the method includes fetching the KI data from the KI data warehouse. Execution then proceeds to step 320.

In step 320, the method includes fetching labeled data from the entity alert and issue warehouse (e.g., entity alert and issue warehouse 114 of FIG. 1). Such labeled data may for example indicate which entities and/or transactions within a specified time period have been determined to be fraudulent or otherwise anomalous. Execution then proceeds to step 330.

In step 330, the method includes preparing a training dataset as described herein. Execution then proceeds to step 340.

Figure 4A:
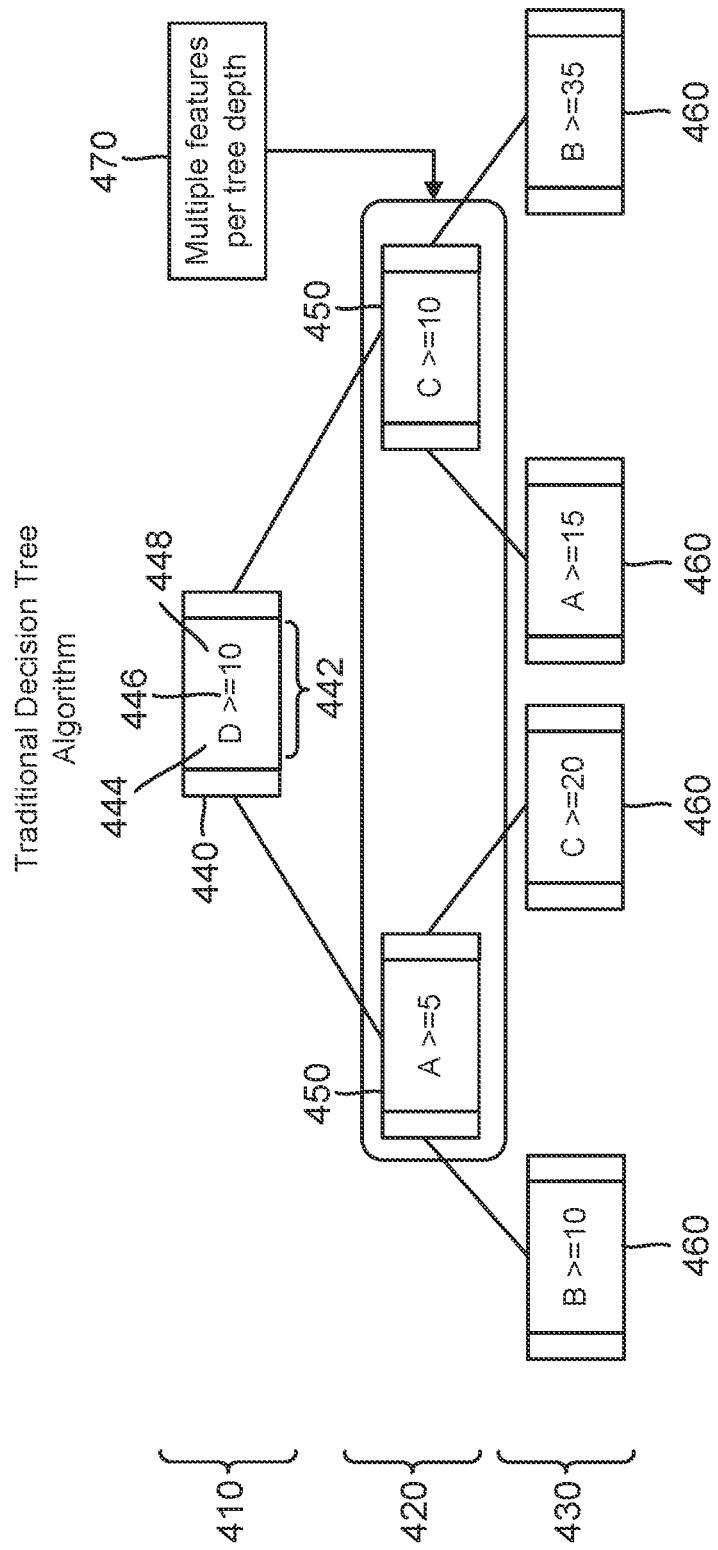
FIG. 4A is a representation, in block diagram form, of a decision tree, according to aspects of the present disclosure.
Figure 4B:
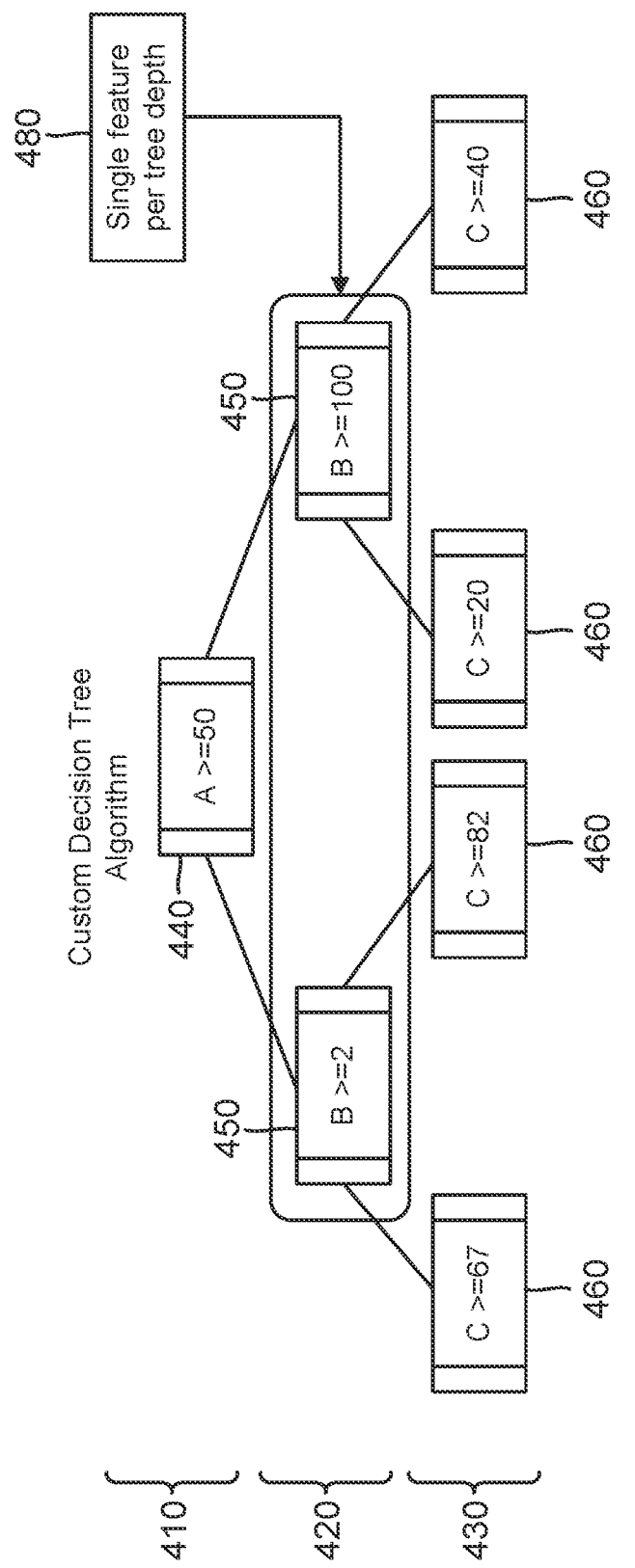
FIG. 4B is a is a representation, in block diagram form, of a decision tree, according to at least one embodiment of the present disclosure.
Figure 5:
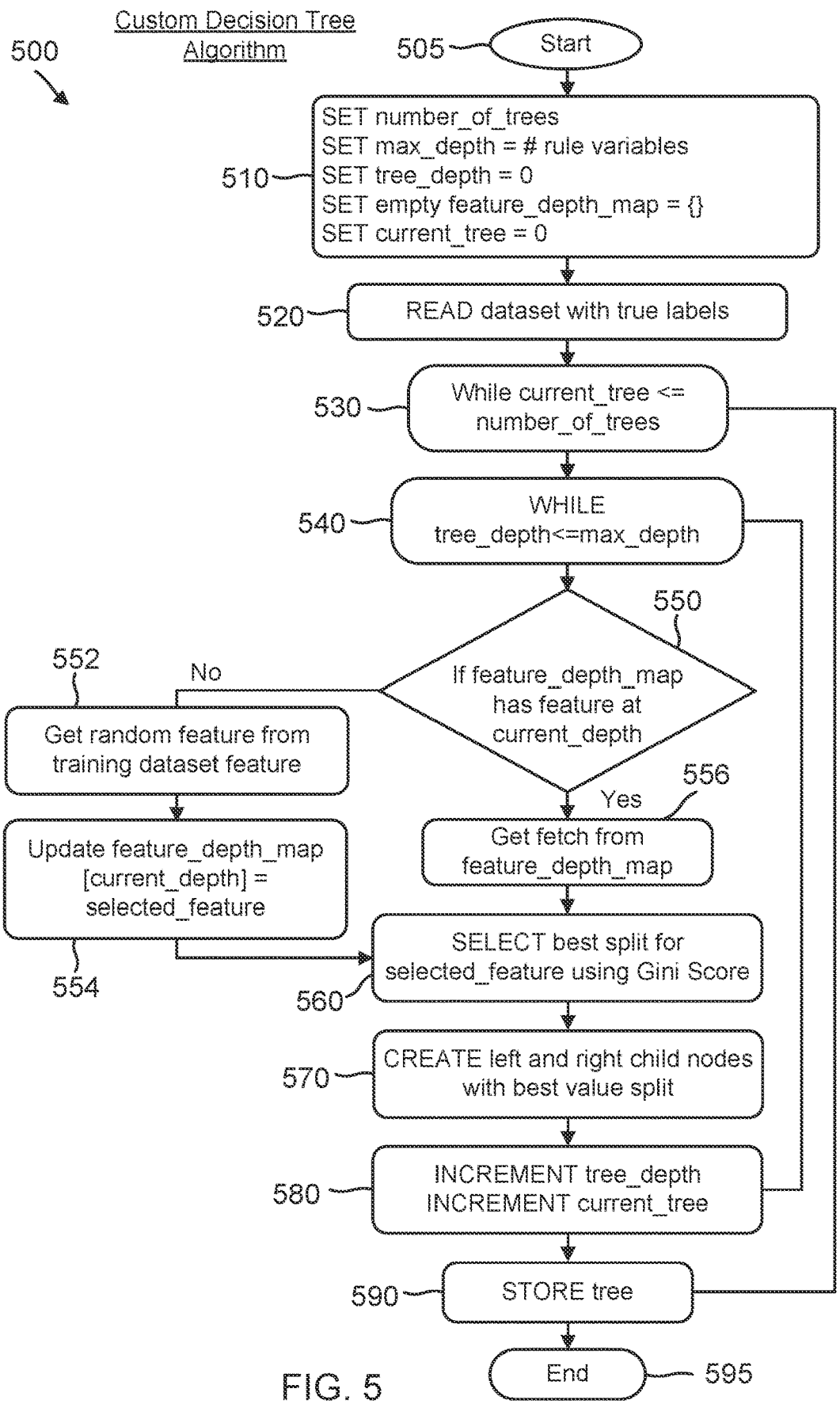
FIG. 5 shows a flow diagram of an example custom machine learning decision tree method that may be performed by the automated rule generation system, according to at least one embodiment of the present disclosure.

In step 340, the method includes initiating the generation of a decision tree forest (as described for example in FIGS. 4b and 5). Execution then proceeds to step 350.

In step 350, the method includes applying the custom decision tree algorithm (as described for example in FIGS. 4b and 5). Execution then proceeds to step 360.

In step 360, the method includes determining whether the generation of the decision tree forest is complete. If yes, execution proceeds to step 370. If no, execution returns to step 350.

Figure 6:
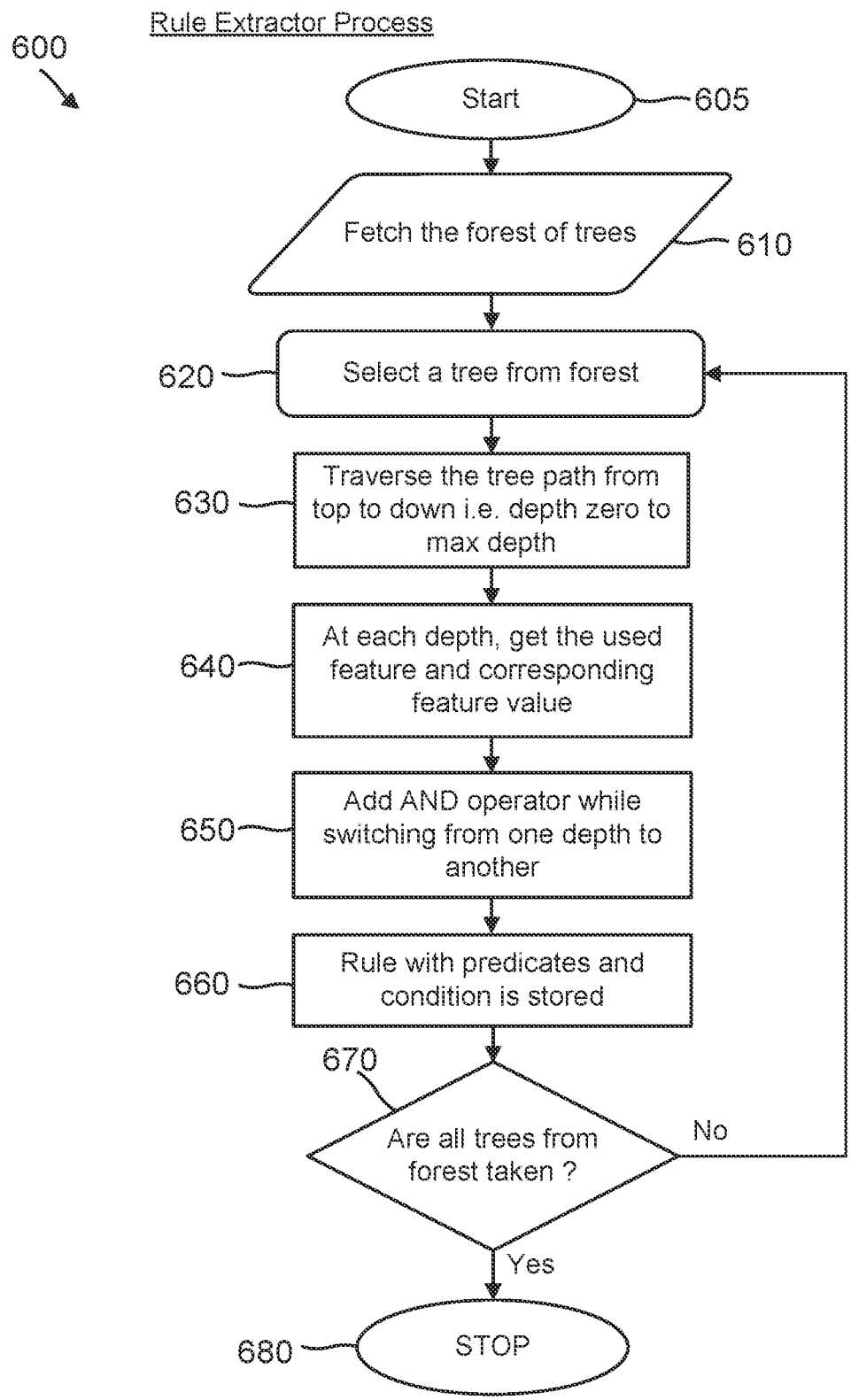
FIG. 6 shows a flow diagram of an example rule extraction method that may be performed by the automated rule generation system, according to at least one embodiment of the present disclosure.

In step 370, the method includes running a rule extraction process (as described for example in FIG. 6). Execution then proceeds to step 380.

Figure 7:
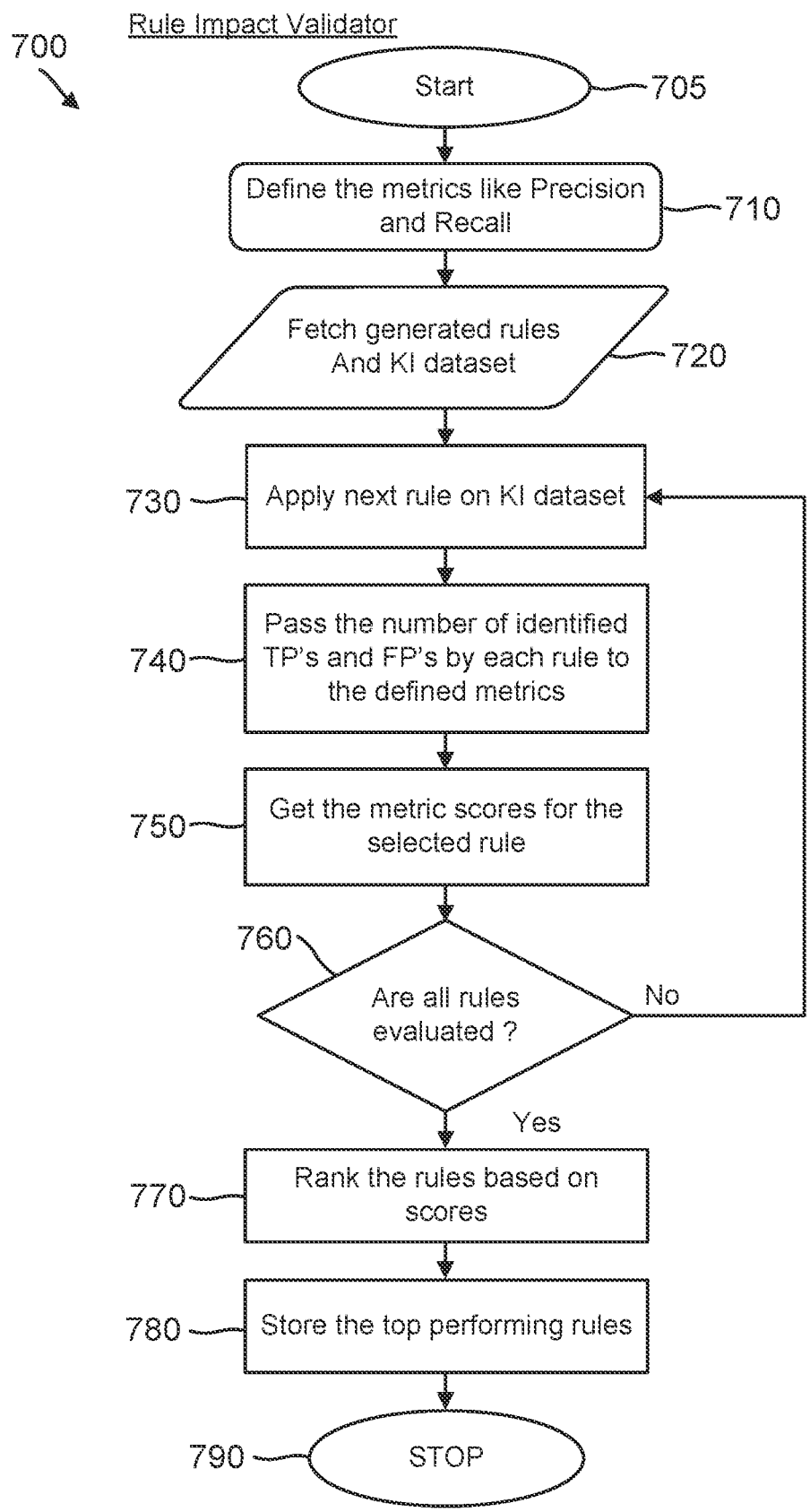
FIG. 7 shows a flow diagram of an example rule impact validation method that may be performed by the automated rule generation system, according to at least one embodiment of the present disclosure.

In step 380, the method includes running a rule impact validator process (as described for example in FIG. 7). Execution then proceeds to step 390.

Figure 8:
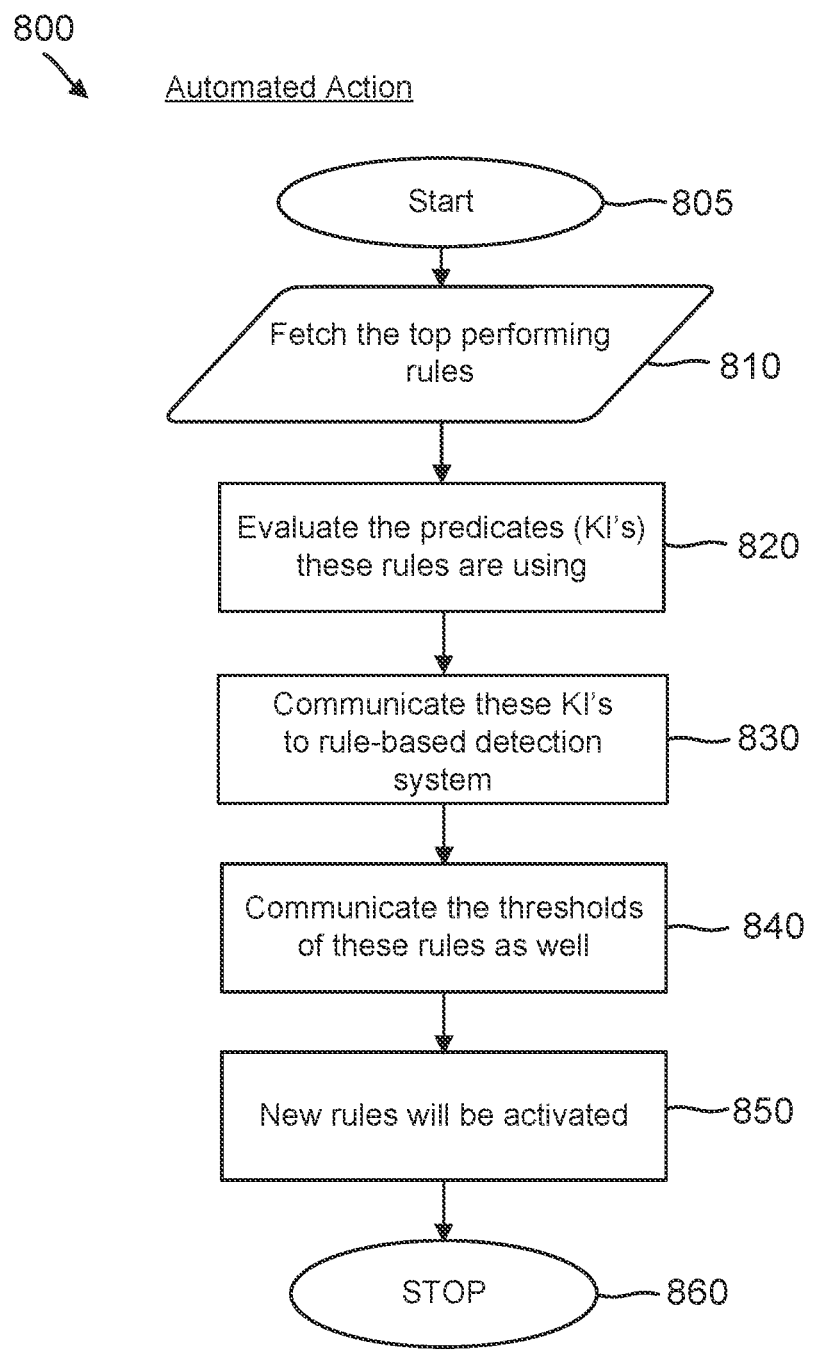
FIG. 8 shows a flow diagram of an example rule formatting and activation method that may be performed by the automated rule generation system, according to at least one embodiment of the present disclosure.

In step 390, the method includes an automated process for configuring the top-performing rules (as described for example in FIG. 8). Execution then proceeds to step 395.

In step 395, the method is complete.

FIG. 4A is a representation, in block diagram form, of a decision tree 400 according to aspects of the present disclosure. The decision tree 400 includes a top layer or depth 410 (e.g., depth=0), a middle layer or depth 420 (e.g., depth=1), and a bottom layer or depth 430 (e.g., depth=3 or depth=max_depth, where max_depth is a variable specifying the maximum depth of the decision trees generated by the decision tree algorithm (e.g., the custom machine learning decision tree algorithm 150 of FIG. 1). It is understood that a decision tree may have any number of layers or depths, from two to several hundred, although values between 3 and 5 may be more commonly employed for fraud detection systems.

The top layer 410 includes a top node 440, which includes a logical clause, predicate, or feature 442 that is extracted from KI data for an entity's transactions. A logical clause, predicate, or feature 442 may for example include a detection variable 444, a logical or arithmetic operator 446, and a test expression 448. The detection variable 444 may for example be a KI. Logical or arithmetic operators 446 may include, but are not limited to, $=, >, <, >=, <=$, or $!=$. The test expression 448 may serve as an upper threshold, a lower threshold, a trigger value, or otherwise. The test expression 448 may be a number (e.g., in the example shown in FIG. 4A, it is an integer), although it may also be a KI or a function of one or more KIs. The top node 440 branches to two nodes 450 in the middle layer or depth 420, and each node 450 branches to two nodes 460 in the bottom layer 430, such that the bottom layer 430 contains four nodes. Decision trees with a greater maximum depth may include 8, 16, 32, or more nodes. Each node 440, 450, or 460 includes its own logical clause, predicate, or feature 442, each of which includes a detection variable 444, a logical or arithmetic operator 446, and a test expression 448.

Rule generation systems currently in use may sometimes make use of a decision tree 400 in order to develop a rule. However, the method 470 for generating rules in current rule generation systems permits both the detection variable 444 and the test expression 448 to be functions of one or more KIs. Furthermore, the method 470 for generating rules in current rule generation systems permits a rule to incorporate multiple logical clauses, predicates, or features from each layer. The resulting rules, whether or not they are effective at detecting fraud, can be very complex.

Such complexity may slow down the rule generation process, and may make rules more difficult for humans to read or interpret, and more difficult for rule-based detection systems to implement. In addition, complex rules may be brittle (e.g., subject to failure) in the face of changing market conditions or changing criminal behavior, and may also be prone to conflicting or otherwise interacting with other rules in the rule-based detection system. Thus, a long-felt need exists for improved rule generation systems that are faster, and that produce simpler, more effective rules, that are robust under changing conditions, and yet are easily updated when necessary.

FIG. 4B is a is a representation, in block diagram form, of a decision tree 401 according to at least one embodiment of the present disclosure. Like the decision tree 400 of FIG. 4A, the decision tree 401 is based on transaction KI data for a given entity. However, in this case the decision tree 401 is derived from training data (e.g., training data generated by the training data generation step 140 of FIG. 1), and is generated by a machine learning algorithm (e.g., the custom machine learning decision tree algorithm 150 of FIG. 1). The decision tree 401 includes a top layer 410 containing a node 440, a middle layer 420 containing two nodes 450, and a bottom layer 430 containing four nodes 460. Each node 460 includes a logical clause, predicate, or feature 442, although the values of the detection variables 444, logical or arithmetic operators 446, and test expressions 448 will be different for each decision tree generated from the data.

In some embodiments, the detection variables 444 for each node are limited to being single KIs, and the test expressions 448 for each node are limited to being numerical values. In an example, the test expressions 448 are real numbers with a maximum of three digits after a decimal point.

The custom machine learning decision tree algorithm generates a decision tree based on features defined in the data provided. Each node of the tree is constructed using features which were not previously used in that particular tree. This may for example be done by tracking features used at each depth of the tree. For example, if the algorithm is selecting a feature for creating a new branch at depth=3, it won't use a feature which was used at depth 0 or 1 or 2, and may for example select a random feature which is not used at these depth levels. Use of random features helps to provide coverage in terms of generating a variety of rules using different predicates. This process may continue until either the defined depth of the tree is reached, or there aren't any unused features with which to construct new branches at the next depth.

This process is repeated by the algorithm to generate a decision tree forest of multiple decision trees (e.g., tens, hundreds, thousands, or millions of decision trees). Having a large number of trees helps to generate more rules with different sets of predicates, thus ensuring coverage and variety in the rules thus generated. The maximum depth and number of trees generated may be fixed, user-selectable, or algorithmically selected (e.g., based on the number of KIs, or on other aspects of the training data). In some cases, the maximum depth and number of trees may be selected to ensure a certain probability (e.g., 10%, 50%, 90%, etc.) that all possible combinations of available predicates have been sampled in the generated rules.

Below is pseudocode for the custom machine learning decision tree algorithm.

```
SET number of trees
SET max_depth to number of rule variables
SET depth to zero
CREATE empty feature depth map to track depth and feature
READ dataset with true labels
FOR each tree
   WHILE depth <= max_depth
      IF at current depth any feature is used
         GET the same feature
      ELSE
         GET unused random feature
      SELECT best value split for selected feature based on Gini score
      CREATE left and right child nodes with best value split
      UPDATE map of depth and feature used
      INCREMENT tree depth
   STORE tree
EXTRACT rules from stored trees
EVALUATE rules
```

Another difference between existing systems and the present automated rule generation system is that the rule extraction method 480 only selects one feature from each depth of a given tree, and generates a logical predicate or clause from that feature. In some embodiments, the max depth of the decision trees is a user-settable parameter, which may then control the maximum number of logical predicates or clauses in the generated rules. For example, if the max tree depth is set to 5, then the generated rules may each contain 5 or fewer predicates or clauses. In some embodiments, each predicate or clause, except the first predicate or clause in a given rule, is preceded by an AND statement, thus producing a simple, easily readable rule that contains no nested logical clauses, and no clauses including OR, NAND, XOR, NOT, or other complex logical operators or groupings thereof.

Furthermore, in some embodiments, when a rule is being constructed or extracted, the rule extraction method 480 does not allow a particular predicate or clause to be included in the rule if that predicate or clause is a repetition of, or otherwise logically redundant with, a predicate or clause that already exists in the rule. For example, if the rule already contains a predicate "A>=10", then a new predicate "A>5" is logically redundant and may not be added. Conversely, if the rule already contains "A>=10", then a new predicate "A>15" is not logically redundant, and may be added to the rule in place of the "A>=10" predicate. Differently stated, "A>15" is not logically redundant with "A>=10", because "A>15" allows a smaller number of possible values and is therefore more constraining. However, "A>=10" is logically redundant with "A>15", because "A>=10" permits a larger number of possible values and is therefore less constraining. Thus, if both of these predicates or clauses appear in the same rule, the redundant or less constraining predicate is the one that is removed. This culling process can lead to simpler rules, with a number of logical clauses equal to or less than the maximum depth of the decision trees.

In some embodiments, rather than adding and then culling a rule, the algorithm simply prevents redundant rules from being generated. For example, if a rule already has a predicate with a particular KI, there won't be another predicate with same KI for that rule, so that e.g. a rule such as Rule=A>10 AND B>2 AND A>15 would not be generated. However, another rule, using the same KI, could be extracted from the same decision tree. For example, Rule1=A>10 AND B>2; Rule2=A>15 AND C>4. In some embodiments, rules that are determined to be redundant or contradictory may also be culled, or may be prevented from being generated.

FIG. 5 shows a flow diagram of an example custom machine learning decision tree method 500 that may be performed by the automated rule generation system 100, according to at least one embodiment of the present disclosure.

In step 510, the method includes initializing variables that may be necessary to complete the method. Execution then proceeds to step 520.

In step 520, the method includes reading the training dataset items with "true" labels, or that are otherwise flagged as fraudulent or anomalous. Execution then proceeds to step 530.

In step 530, the method includes starting a loop that will execute until the specified number of decision trees has been generated. Execution then proceeds to step 540.

In step 540, the method includes starting a loop that will execute until the maximum specified tree depth has been achieved for the current tree. Execution then proceeds to step 550.

In step 550, the method includes determining whether an unused feature or predicate is available in the feature map at the current depth. If yes, execution proceeds to step 556. If no, execution proceeds to step 552.

In step 552, the method includes fetching random features from the training dataset. Execution then proceeds to step 554.

In step 554, the method includes updating the feature depth map to include the current feature at the current depth. Execution then proceeds to step 560.

In step 556, the method includes fetching the available feature from the feature map at the current depth. Execution then proceeds to step 560.

In step 560, the method includes selecting the best split for the selected feature, such as the split most likely to yield a strong detection rule. This may be determined for example using a Gini score (which measures statistical dispersion, e.g., the inequality among values of a frequency distribution). Execution then proceeds to step 570.

In step 570, the method includes creating left and right child nodes using a best value split. Execution then proceeds to step 580.

In step 580, the method includes incrementing either or both of the tree depth and the current tree, depending on the state of the loops. Execution then proceeds to step 540 if the inner loop is not complete, and to step 590 if the inner loop is complete.

In step 590, the method includes storing the current tree into the decision tree forest. Execution then proceeds to step 595 if the outer loop is complete, and to step 530 if the outer loop is not complete.

In step 595, the method is complete.

FIG. 6 shows a flow diagram of an example rule extraction method 600 that may be performed by the automated rule generation system 100, according to at least one embodiment of the present disclosure. During the whole process of tree construction, the values which are used to split and create new branch are tracked and used as predicates in the rule generation process. Rules are generated by tracking the predicate from tree top, i.e. depth=0 to the bottom of tree, i.e. depth=max_depth. Each predicate is then combined with an "AND" logical operator to form a rule. In this way, rules are extracted from each of the trees that were generated as part of the decision tree forest.

In step 605, the method begins. Execution then proceeds to step 610.

In step 610, the method includes fetching the decision tree forest from memory or storage. Execution then proceeds to step 620.

In step 620, the method includes selecting the next available tree from the decision tree forest. Execution then proceeds to step 630.

In step 630, the method includes traversing a path from the top of the tree (depth=0) to the bottom of the tree (depth=max_depth), such that the path includes only one node from each depth. Execution then proceeds to step 640.

In step 640, the method includes, at each depth of the tree, forming a logical predicate from the feature and the feature value at the selected node. Execution then proceeds to step 650.

In step 650, the method includes adding a logical AND operator at the end of each predicate, except at depth=max_depth, such that the predicates form a rule. Execution then proceeds to step 660.

In step 660, the method includes storing the current rule in memory or storage. Execution then proceeds to step 670.

In step 670 the method includes determining whether all trees from the decision tree forest have been examined. If yes, execution proceeds to step 680. If no, execution returns to step 620.

In step 680, the method is complete.

FIG. 7 shows a flow diagram of an example rule impact validation method 700 that may be performed by the automated rule generation system 100, according to at least one embodiment of the present disclosure. Once rules are extracted, the impact or performance for each rule is calculated to decide the top-performing rules. In the example shown in FIG. 7, one metric used to define the rule performance is Precision=TP/(TP+FP), where TP=True Positive, FP=False Positive, and FN=False Negative.

In step 705, the method begins.

In step 710, the method includes defining the performance metric or metrics. Execution then proceeds to step 720.

In step 720, the method includes fetching the generated rules (e.g., generated by the rule extraction method 600 of FIG. 6) and the training dataset. Execution then proceeds to step 730.

In step 730, the method includes selecting the next rule and applying it against the training dataset. Execution then proceeds to step 740.

In step 740, the method includes computing the number of TP, FP, TN, and FN generated by the rule. Execution then proceeds to step 750.

In step 750, the method includes computing the performance metric(s) for the selected rule. Execution then proceeds to step 760.

In step 760, the method includes determining whether all of the generated rules have been evaluated. If yes, execution proceeds to step 770. If no, execution returns to step 730.

In step 770, the method includes ranking the rules based on the performance metric(s). Execution then proceeds to step 780.

In step 780, the method includes storing the top-performing rules in memory or storage. Execution then proceeds to step 790.

In step 790, the method is complete.

FIG. 8 shows a flow diagram of an example rule formatting and activation method 800 that may be performed by the automated rule generation system 100, according to at least one embodiment of the present disclosure. Once top performing rules are identified, they can be configured for use in the rule-based detection system based on the KI-logic used for each of the predicates in the rule. In some embodiments, thresholds from predicates also can be used to tune a previously existing rule used by the rule-based detection system.

In step 805, the method begins.

In step 810, the method includes fetching the top-performing rules from memory or storage. Execution then proceeds to step 820.

In step 820, the method includes evaluating the KIs used by each rule. Execution then proceeds to step 830.

In step 830, the method includes communicating the KIs to the rule-based detection system. Execution then proceeds to step 840.

In step 840, the method includes communicating the thresholds (e.g., predicates) for each of the communicated KIs to the rule-based detection system. Execution then proceeds to step 860.

In step 860, the method is complete.

Figure 9:
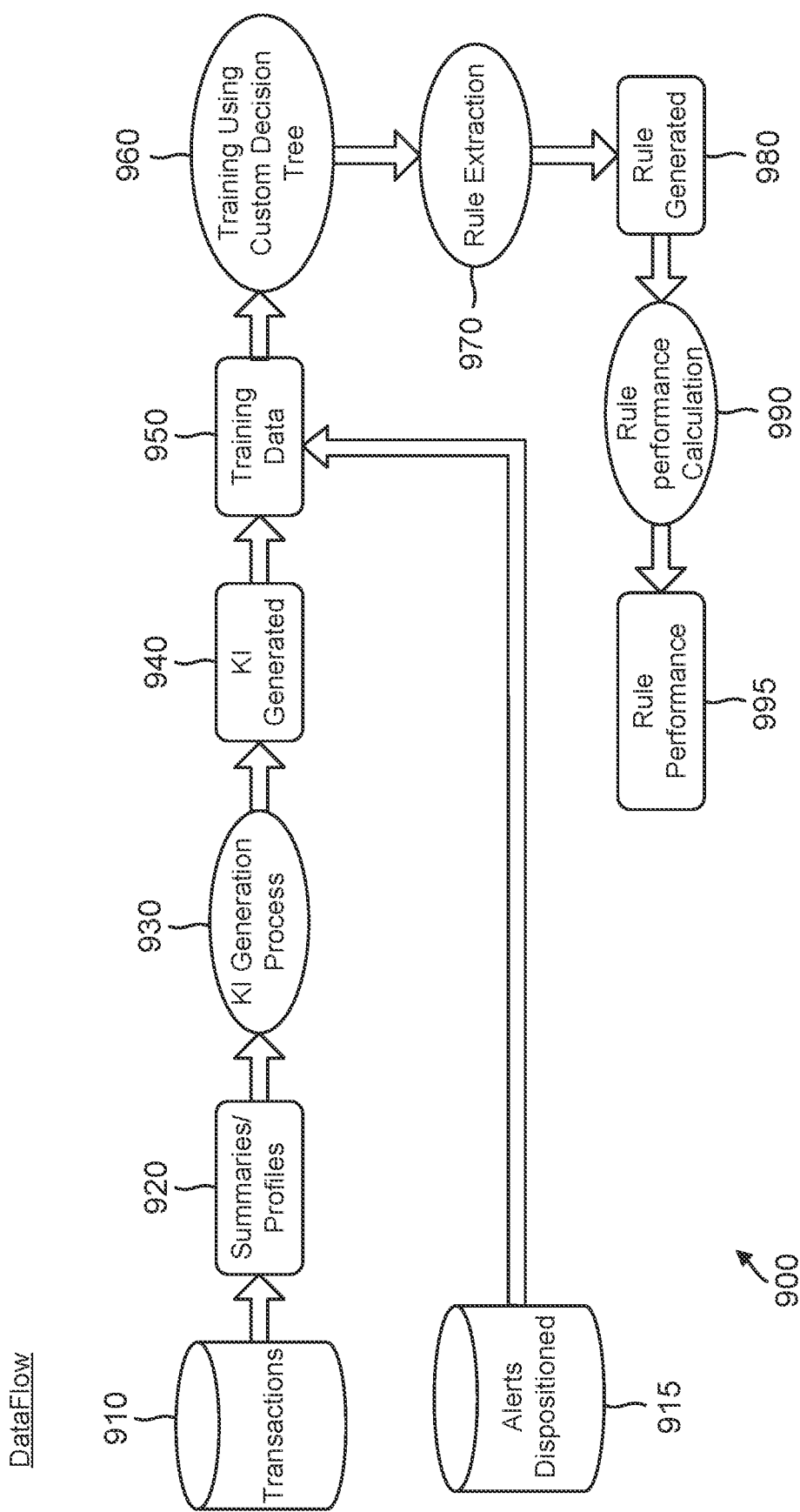
FIG. 9 is a representation, in block diagram form, of at least a portion of an example data flow of an example automated rule generation system, in accordance with at least one embodiment of the present disclosure.

FIG. 9 is a representation, in block diagram form, of at least a portion of an example data flow 900 of an example automated rule generation system 100, in accordance with at least one embodiment of the present disclosure. The data flow 900 includes a database of transactions, which is received into a store of summaries and/or profiles 920, which is then received into a KI generation process 930, which generates KIs 940. The generated KIs 940 are combined with alerts stored in an alerts database 915, to form training data 950. The training data is used for training 960 with a custom machine learning decision tree algorithm, after which a rule extraction process 970 generates rules 980. The generated rules 980 are received into rule performance calculations 990, after which rule performance 995 is calculated.

In an example, solutions employing the systems, methods, and data flows described above have been demonstrated for SAM AML Rules with example client production data. A KI dataset was created for a "CL_0_999" population group and one month's worth of summary data. 54 features (expressible as logical clauses or predicates) were identified, with 82 TP, 1203 FP and 99402 non-alerted entities. KI features were created for each transaction type group: monthly value (17 features), monthly volume (17 features), monthly sum over credit limit (17 features), and one static attribute (credit limit).

Applying the methods of the present disclosure to this dataset yielded a decision tree forest of 120 trees, with 1450 rules extracted.

In spite of limited input features, the 1450 extracted rules included a high number of simple and effective rules, including non-obvious or counterintuitive rules which might not occur to a subject matter expert. A high proportion of these rules generated a number of new alerts that was greater than or equal to the number of potential false negatives. 377 of the generated rules yielded at least 10 TP hits, and were deemed "effective". Of these 377 effective rules, 10 rules demonstrated 75%-100% precision, 10 rules demonstrated 50%-75% precision, 16 rules demonstrated 25-50% precision, and 341 rules generated 0-25% precision. Generally speaking, within the banking industry a fraud detection precision of 25% may be considered "good", and a precision of 50% may be considered "excellent". Thus, the automatic generation of 20 "excellent" rules and an additional 16 "good" rules demonstrates a clear improvement over present systems. Moreover, because the automated rule generation system can be operated in near-real time (e.g., on an hourly, daily, or weekly basis), it is capable of generating these improved results much more rapidly and/or more frequently than existing systems.

Figure 10:
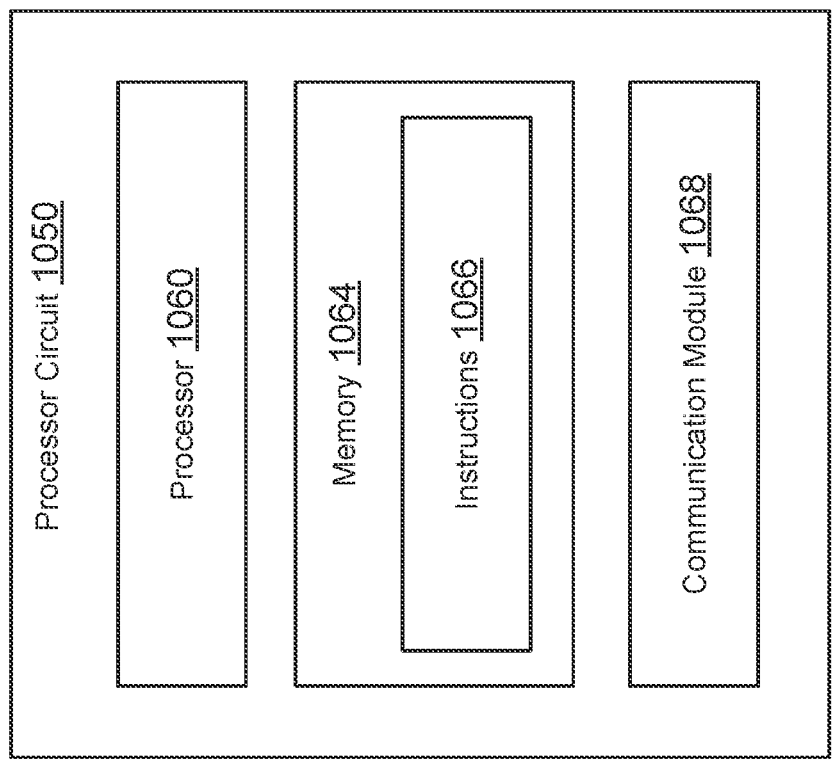
FIG. 10 is a schematic diagram of a processor circuit, in accordance with at least one embodiment of the present disclosure.

FIG. 10 is a schematic diagram of a processor circuit 1050, according to embodiments of the present disclosure. The processor circuit 1050 may be implemented in the automated rule generation system 100, or other devices or workstations (e.g., third-party workstations, network routers, etc.), or on a cloud processor or other remote processing unit, as necessary to implement the method. As shown, the processor circuit 1050 may include a processor 1060, a memory 1064, and a communication module 1068. These

TABLE 1

KIs of selected transactions

| Entity | trx_reg_sum_TRN-INN | trx_qty_CHR_OUT | trx_reg_sum_CRP_INN_ratio | acct_curr_credit_limit | target |
|---|---|---|---|---|---|
| 1 | 125.00 | 11.0 | 35.714 | 350.0 | 0 |
| 2 | 56.39 | 2.0 | 22.556 | 250.0 | 0 |
| 3 | 1352.54 | 24.0 | 679.084 | 750.0 | 1 |
| 4 | 2747.45 | 101.0 | 366.327 | 750.0 | 1 |
| 5 | −1422.35 | 7.0 | 824.374 | 500.0 | 1 |

TABLE 2

Some sample rules generated

| | 0 | 1 | Recall | Precision | F1 | Fbeta |
|---|---|---|---|---|---|---|
| ('trx_reg_sum_CRP_INN' < 2968.58) and ('trx_reg_sum_CRP_INN_ratio' >= 285.22) and ('trx_reg_sum_TRN_ALL_ratio' < 319.816) and ('trx_reg_sum_ALL_PRT_ratio' < 244.604) | 96.0 | 35.0 | 42.68 | 26.72 | 16.432 | 41.721 |
| ('trx_reg_sum_CRP_INN_ratio' >= 616.752) and ('trx_reg_sum_EFT_INN_ratio' < 251.164) and ('trx_qty_CRP_INN' < 30.0) | 9.0 | 17.0 | 20.73 | 65.38 | 15.740 | 21.289 |
| ('trx_reg_sum_CRP_INN_ratio' >= 616.752) and ('trx_reg_sum_EFT_INN' < 1570.82) and ('trx_qty_TRN_OUT' < 30.0) | 11.0 | 17.0 | 20.73 | 60.71 | 15.453 | 21.268 | elements may be in direct or indirect communication with each other, for example via one or more buses.

The processor 1060 may include a central processing unit (CPU), a digital signal processor (DSP), an ASIC, a controller, or any combination of general-purpose computing devices, reduced instruction set computing (RISC) devices, application-specific integrated circuits (ASICs), field programmable gate arrays (FPGAs), or other related logic devices, including mechanical and quantum computers. The processor 1060 may also include another hardware device, a firmware device, or any combination thereof configured to perform the operations described herein. The processor 1060 may also be implemented as a combination of computing devices, e.g., a combination of a DSP and a microprocessor, a plurality of microprocessors, one or more microprocessors in conjunction with a DSP core, or any other such configuration.

The memory 1064 may include a cache memory (e.g., a cache memory of the processor 1060), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 1064 includes a non-transitory computer-readable medium. The memory 1064 may store instructions 1066. The instructions 1066 may include instructions that, when executed by the processor 1060, cause the processor 1060 to perform the operations described herein. Instructions 1066 may also be referred to as code. The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may include a single computer-readable statement or many computer-readable statements.

The communication module 1068 can include any electronic circuitry and/or logic circuitry to facilitate direct or indirect communication of data between the processor circuit 1050, and other processors or devices. In that regard, the communication module 1068 can be an input/output (I/O) device. In some instances, the communication module 1068 facilitates direct or indirect communication between various elements of the processor circuit 1050 and/or the automated rule generation system 100. The communication module 1068 may communicate within the processor circuit 1050 through numerous methods or protocols. Serial communication protocols may include but are not limited to United States Serial Protocol Interface (US SPI), Inter-Integrated Circuit (I²C), Recommended Standard 232 (RS-232), RS-485, Controller Area Network (CAN), Ethernet, Aeronautical Radio, Incorporated 429 (ARINC 429), MODBUS, Military Standard 1553 (MIL-STD-1553), or any other suitable method or protocol. Parallel protocols include but are not limited to Industry Standard Architecture (ISA), Advanced Technology Attachment (ATA), Small Computer System Interface (SCSI), Peripheral Component Interconnect (PCI), Institute of Electrical and Electronics Engineers 488 (IEEE-488), IEEE-1284, and other suitable protocols. Where appropriate, serial and parallel communications may be bridged by a Universal Asynchronous Receiver Transmitter (UART), Universal Synchronous Receiver Transmitter (USART), or other appropriate subsystem.

External communication (including but not limited to software updates, firmware updates, or preset sharing between the processor and a central server) may be accomplished using any suitable wireless or wired communication technology, such as a cable interface such as a universal serial bus (USB), micro USB, Lightning, or FireWire interface, Bluetooth, Wi-Fi, ZigBee, Li-Fi, or cellular data connections such as 2G/GSM (global system for mobiles), 3G/UMTS (universal mobile telecommunications system), 4G/LTE/WiMax, or 5G. For example, a Bluetooth Low Energy (BLE) radio can be used to establish connectivity with a cloud service, for transmission of data, and for receipt of software patches. The controller may be configured to communicate with a remote server, or a local device such as a laptop, tablet, or handheld device, or may include a display capable of showing status variables and other information. Information may also be transferred on physical media such as a USB flash drive or memory stick.

As will be readily appreciated by those having ordinary skill in the art after becoming familiar with the teachings herein, the automated rule generation system advantageously provides improved detection accuracy, improved simplicity and effectiveness of rules, generation of obscure or counterintuitive rules, improved speed and frequency of rule generation, and thus a greater ability to adapt to changing market conditions and criminal behavior, as compared with existing rule-based fraud detection systems.

Because the automated rule generation system is automated, introducing a new rule, or a large plurality of new rules, can be straightforward and quick, with high confidence that the new rules will be both effective and simple. Furthermore, the automated rule generation system is scalable enough to identify a top-performing rule from thousands or even millions of useful features. Such rules can be shared across multiple financial institutions in real time or near-real time, without compromising any client data, and can be validated by the financial institutions, such that top-performing rules across multiple institutions can be identified and added to a library of highly effective rules. Such a library may for example be stored on a server accessible to clients who request access, and may be of particular value to new clients with no history of fraudulent activity (e.g., a new retailer with limited sales history). Furthermore, rules can be quickly adapted to changing patterns in the dataset, and can even be generated in real time, while the rule-based fraud detection system is in use.

Accordingly, it can be seen that the automated rule generation system fills a long-standing need in the art, by addressing the limitations of present systems and improving the operation of fraud detection computer systems.

A number of variations are possible on the examples and embodiments described above. For example, sharing of rules or data between customers (e.g., data on the effectiveness of shared rules) may be included as an automated feature of the system.

The technology described herein may be implemented for fraud detection in financial or retain transactions, but may also be used for other applications where identifying anomalies in large datasets is desired.

Accordingly, the logical operations making up the embodiments of the technology described herein are referred to variously as operations, steps, objects, elements, components, or modules. Furthermore, it should be understood that these may occur or be performed or arranged in any order, unless explicitly claimed otherwise or a specific order is inherently necessitated by the claim language.

All directional references e.g., upper, lower, inner, outer, upward, downward, left, right, lateral, front, back, top, bottom, above, below, vertical, horizontal, clockwise, counterclockwise, proximal, and distal are only used for identification purposes to aid the reader's understanding of the claimed subject matter, and do not create limitations, particularly as to the position, orientation, or use of the dimensional reduction integrated fraud management system. Connection references, e.g., attached, coupled, connected, joined, or "in communication with" are to be construed broadly and may include intermediate members between a collection of elements and relative movement between elements unless otherwise indicated. As such, connection references do not necessarily imply that two elements are directly connected and in fixed relation to each other. The term "or" shall be interpreted to mean "and/or" rather than "exclusive or." The word "comprising" does not exclude other elements or steps, and the indefinite article "a" or "an" does not exclude a plurality. Unless otherwise noted in the claims, stated values shall be interpreted as illustrative only and shall not be taken to be limiting.

The above specification, examples and data provide a complete description of the structure and use of exemplary embodiments of the automated rule generation system as defined in the claims. Although various embodiments of the claimed subject matter have been described above with a certain degree of particularity, or with reference to one or more individual embodiments, those skilled in the art could make numerous alterations to the disclosed embodiments without departing from the spirit or scope of the claimed subject matter.

Still other embodiments are contemplated. It is intended that all matter contained in the above description and shown in the accompanying drawings shall be interpreted as illustrative only of particular embodiments and not limiting. Changes in detail or structure may be made without departing from the basic elements of the subject matter as defined in the following claims.

What is claimed is:

1. A system adapted to automatically generate and validate rules for monitoring suspicious activity, the system comprising:
a processor and a computer readable medium operably coupled thereto, the computer readable medium comprising a plurality of instructions stored in association therewith that are accessible to, and executable by, the processor, to perform operations which comprise:
 for a first period of time:
  collecting a first group of transactions issued by an issuer;
  automatically identifying and storing a plurality of key indicators of the first group of transactions;
  automatically storing pre-identified fraudulent transactions of the first group of transactions;
 based on the plurality of key indicators and the pre-identified fraudulent transactions, creating a training dataset;
 using the training dataset:
  training a custom decision tree machine learning algorithm; and
  generating a feature depth map comprising a user-definable number of layers;
 with the custom decision tree machine learning algorithm, generating a decision tree incorporating logical predicates including at least one key indicator of the plurality of key indicators by:
  for each layer of the feature depth map:
   if the layer contains a feature, fetching the feature from the feature depth map;
   if the layer does not contain a feature, fetching a random feature from the training dataset;
   selecting a split for the fetched feature based on a dispersion score; and
   using the split, creating left and right child nodes for that layer,
  wherein no two of the logical predicates within the decision tree are the same;
 based on the decision tree, generating a plurality of rules, wherein each rule of the plurality of rules incorporates only one logical predicate from each layer of the decision tree; and
 for a second period of time, in real time:
 collecting a second group of transactions issued by an issuer;
 generating a quality metric for each respective rule of the plurality of rules, by automatically testing the plurality of rules against the second group of transactions;
 identifying a subset of rules of the plurality of rules for which the respective quality metric exceeds a threshold value; and
 displaying the subset of rules on a display,
 wherein the displayed subset of rules comprises fewer, rules with fewer logical predicates than a set of rules generated from the first group of transactions wherein each rule of the plurality of rules incorporates a plurality of logical predicates from each layer of the decision tree.

2. The system of claim 1, wherein the plurality of key indicators includes at least one of a transaction value for at least one transaction of the first group of transactions, a volume of transactions of the issuer, a credit limit of the issuer, a risk category of the issuer, or a net worth of the issuer, or a ratio of any two of the foregoing.

3. The system of claim 2, wherein the plurality of key indicators includes at least one of a monthly pattern or a weekly pattern of the at least one key indicator of the plurality of key indicators.

4. The system of claim 1, wherein the operations further comprise, for each respective rule of the plurality of rules, if a first logical predicate of the respective rule is logically redundant with a second logical predicate of the respective rule, deleting the first logical predicate of the respective rule.

5. The system of claim 1, wherein the quality metric comprises at least one of a number or fraction of true positives, a number or fraction of false positives, a precision value, a recall value, an F1 value, or an FBeta value.

6. The system of claim 1, wherein the quality metric comprises a number of logical predicates within the respective rule.

7. The system of claim 1, wherein the operations further comprise:
with the learning algorithm, generating a plurality of decision trees, wherein each decision tree of the plurality of decision trees incorporates logical predicates including at one of the plurality of key indicators, wherein no two of the logical predicates within any tree of the plurality of decision trees are the same; and
based on each respective decision tree of the plurality of decision trees, generating a plurality of additional rules of the plurality of rules, wherein each additional rule of the plurality of rules incorporates only one logical predicate from each layer of the respective decision tree of the plurality of decision trees.

8. The system of claim 1, wherein the operations further comprise:
- generating a respective plurality of quality metrics for each respective rule of the plurality of rules, by automatically testing the plurality of rules against the second group of transactions; and
- identifying the subset of rules of the plurality of rules based on whether any respective quality metric of the respective plurality of quality metrics exceeds a respective threshold for that respective quality metric.

9. The system of claim 1, wherein the learning algorithm is a rule-based machine learning algorithm.

10. The system of claim 9, wherein the rule-based machine learning algorithm is a learning classifier system, association rule learning system, or artificial immune system.

11. A computer-implemented method adapted to automatically generate and validate rules for monitoring suspicious activity, the method comprising:
- for a first period of time:
  - collecting a first group of transactions issued by an issuer;
  - automatically identifying and storing a plurality of key indicators of the first group of transactions;
  - automatically storing pre-identified fraudulent transactions of the first group of transactions;
  - based on the plurality of key indicators and the pre-identified fraudulent transactions, creating a training dataset;
  - using the training dataset:
    - training a custom decision tree machine learning algorithm; and
    - generating a feature depth map comprising a user-definable number of layers;
  - with the custom decision tree machine learning algorithm, generating a decision tree incorporating logical predicates including at least one key indicator of the plurality of key indicators by:
    - for each layer of the feature depth map:
      - if the layer contains a feature, fetching the feature from the feature depth map;
      - if the layer does not contain a feature, fetching a random feature from the training dataset;
      - selecting a split for the fetched feature based on a dispersion score; and
      - using the split, creating left and right child nodes for that layer,
    - wherein no two of the logical predicates within the decision tree are the same;
  - based on the decision tree, generating a plurality of rules, wherein each rule of the plurality of rules incorporates only one logical predicate from each layer of the decision tree; and
- for a second period of time, in real time:
  - collecting a second group of transactions issued by an issuer;
  - generating a quality metric for each respective rule of the plurality of rules, by automatically testing the plurality of rules against the second group of transactions;
  - identifying a subset of rules of the plurality of rules for which the respective quality metric exceeds a threshold value; and
  - displaying the subset of rules on a display,
  wherein the displayed subset of rules comprises fewer, rules with fewer logical predicates than a set of rules generated from the first group of transactions wherein each rule of the plurality of rules incorporates a plurality of logical predicates from each layer of the decision tree.

12. The computer-implemented method of claim 11, wherein the plurality of key indicators includes at least one of a transaction value for at least one transaction of the first group of transactions, a volume of transactions of the issuer, a credit limit of the issuer, a risk category of the issuer, or a net worth of the issuer, or a ratio of any two of the foregoing.

13. The computer-implemented method of claim 12, wherein the plurality of key indicators includes at least one of a monthly pattern or a weekly pattern of the at least one key indicator of the plurality of key indicators.

14. The computer-implemented method of claim 11, further comprising, for each respective rule of the plurality of rules, if a first logical predicate of the respective rule is logically redundant with a second logical predicate of the respective rule, deleting the first logical predicate of the respective rule.

15. The computer-implemented method of claim 11, wherein the quality metric comprises at least one of a number or fraction of true positives, a number or fraction of false positives, a precision value, a recall value, an F1 value, or an FBeta value.

16. The computer-implemented method of claim 11, wherein the quality metric comprises a number of logical predicates within the respective rule.

17. The computer-implemented method of claim 11, further comprising:
- with the learning algorithm, generating a plurality of decision trees, wherein each decision tree of the plurality of decision trees incorporates logical predicates including at least one of the plurality of key indicators, wherein no two of the logical predicates within any tree of the plurality of decision trees are the same; and
- based on each respective decision tree of the plurality of decision trees, generating a plurality of additional rules of the plurality of rules, wherein each additional rule of the plurality of rules incorporates only one logical predicate from each layer of the respective decision tree of the plurality of decision trees.

18. The computer-implemented method of claim 11, further comprising:
- generating a respective plurality of quality metrics for each respective rule of the plurality of rules, by automatically testing the plurality of rules against the second group of transactions; and
- identifying the subset of rules of the plurality of rules based on whether any respective quality metric of the respective plurality of quality metrics exceeds a respective threshold for that respective quality metric.

19. The computer-implemented method of claim 11, wherein the learning algorithm is a rule-based machine learning algorithm.

20. The computer-implemented method of claim 19, wherein the rule-based machine learning algorithm is a learning classifier system, association rule learning system, or artificial immune system.

* * * * *